Oct. 17, 1961   E. B. GARDNER   3,004,288
METHOD AND APPARATUS FOR SHAPING PLASTIC SHEET MATERIAL
Filed Oct. 19, 1955   7 Sheets-Sheet 1

INVENTOR
EDWARD BOYD GARDNER
BY Bates + Willard
ATTORNEYS

Fig. 2, Fig. 3, Fig. 4, Fig. 5

INVENTOR
EDWARD BOYD GARDNER
BY Bates + Willard
ATTORNEYS

FIG.6

Oct. 17, 1961 E. B. GARDNER 3,004,288
METHOD AND APPARATUS FOR SHAPING PLASTIC SHEET MATERIAL
Filed Oct. 19, 1955 7 Sheets-Sheet 4

INVENTOR
EDWARD BOYD GARDNER
BY Bates + Willard
ATTORNEYS

Oct. 17, 1961 — E. B. GARDNER — 3,004,288
METHOD AND APPARATUS FOR SHAPING PLASTIC SHEET MATERIAL

INVENTOR
EDWARD BOYD GARDNER
BY Bates + Willard
ATTORNEYS

United States Patent Office 3,004,288
Patented Oct. 17, 1961

3,004,288
METHOD AND APPARATUS FOR SHAPING PLASTIC SHEET MATERIAL
Edward Boyd Gardner, Bloomfield, Conn., assignor to Emhart Manufacturing Company, Hartford, Conn., a corporation of Delaware
Filed Oct. 19, 1955, Ser. No. 541,355
11 Claims. (Cl. 18—19)

The present invention relates to the reshaping of flat plastic material into hollowed or dished articles of various shapes. Generally, such sheet reshaping practices are referred to as sheet shaping or sheet forming operations. Despite any suggestion which the term may convey to the contrary, sheet shaping generally refers to the reshaping of sheet materials rather than to the initial shaping of the materials into sheet form.

The sheet materials to which the invention is applicable include most, if not all, of those which are either permanently or temporarily thermoplastic. Sheets of these materials may be manufactured in a variety of ways, as by extrusion, casting, drawing, calendering, pressing and numerous modifications and combinations thereof.

Heretofore attempts have been made to provide for rapidly drawing or otherwise shaping articles from sheets or webs of thermoplastic materials.

The problem of providing satisfactory forming methods and apparatus is particularly difficult for those thermoplastic sheet materials in which stretching stresses are captured. These captured stresses, which generally are referred to as orientation stresses, are introduced and captured both monoxially and biaxially to improve the strength, flexibility and other characteristics of the sheet. Sheet material in which these orientation stresses are captured generally are referred to as oriented sheet.

Examples of such sheets are the biaxially oriented polystyrene and methacrylate sheet materials sold by the Plax Corporation under the trademarks Polyflex and Methaflex, respectively.

Considerable difficulty has been encountered in finding a practice which is economically and commercially acceptable for forming articles from such sheet materials.

It is an object of this invention to provide improved method and apparatus for such a practice. While particularly adapted for reshaping oriented or otherwise stressed sheet, the invention is not limited thereto.

A more specific object of the present invention is to preserve the orientation distribution of sheet in the articles formed therefrom and to prevent molecular migration and re-distribution of the orientation stresses.

It is a further object to preserve the thickness distribution of the sheet when the heated sheet is subjected to a stress pattern differing from that captured in the sheet. The difference in stress pattern may result from heating some portions of the sheet prior to others through the unfreezing or stress releasing temperature point or otherwise subjecting softened sheet to a distribution of stresses differing from those exerted and captured when the sheet was formed initially.

As an example of the use to which the present invention is applicable, certain food products, such as cottage cheese, pickles, potato salad, etc., are now packaged in round, paraffin-coated paper containers. The salability of these products is considerably enhanced with a transparent cover which reveals the contents of the package to the consumer.

The present invention provides process and apparatus with which transparent covers are efficiently and economically produced from blanks of oriented thermoplastic sheet cut to size. These covers are non-toxic, tasteless, odorless, moisture-proof, and meet all sanitary standards.

While machines embodying the invention are intended primarily for molding transparent covers for food containers, they also are adaptable for use in molding a variety of other useful plastic articles or novelties from sheet plastic materials.

Other objects and advantages are indicated in or apparent from the following description of an illustrative embodiment of the invention which is made with reference to the accompanying drawings, in which.

General description

Figures 1, 8, 9:
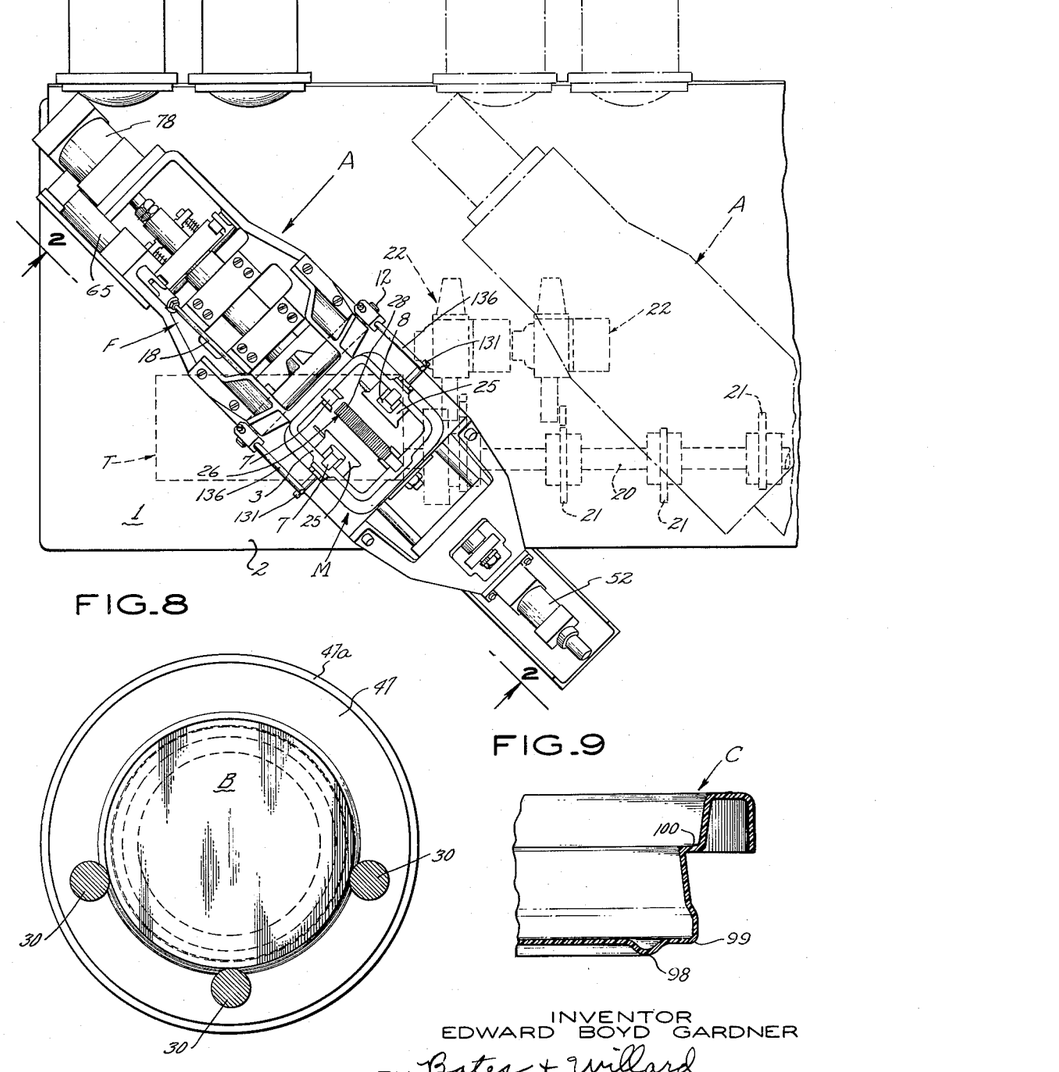
FIGURE 1 is a plan view of a portion of a multi-unit sheet shaping machine embodying the invention and in which one of the several identical shaping units is shown in full and another in phantom.
FIG. 8 is an enlarged cross-sectional view to the scale of FIG. 7 taken generally on the line 8—8 of FIG. 11 showing a plastic blank supported preparatory to reshaping by the mold components.
FIG. 9 is an enlarged cross-sectional view of a portion of the container cover shown in FIG. 20 that is formed by the sheet reshaping mold components.
Figures 2, 3, 4, 5:
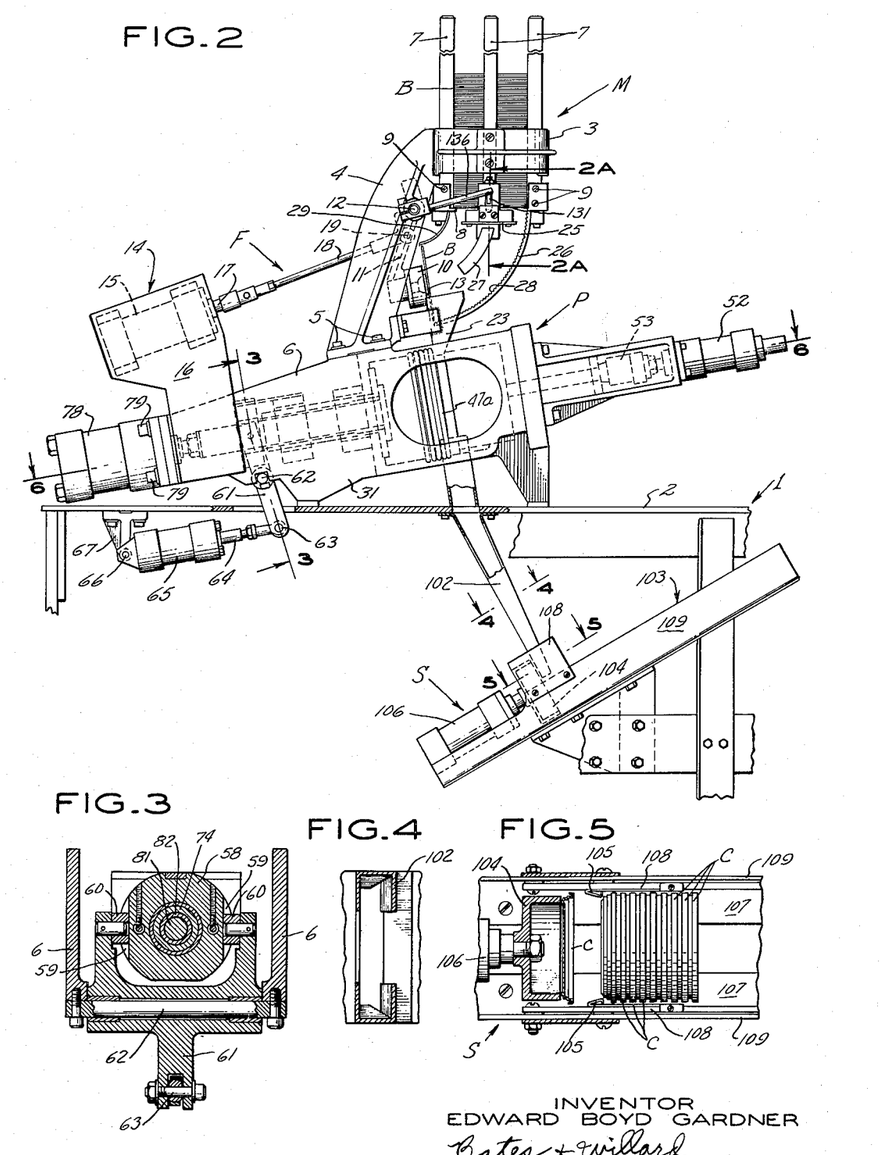
FIG. 2 is a cross-section view taken generally on line 2—2 of FIG. 1 and showing one of the shaping units in elevation.
FIG. 3 is an enlarged cross-section view taken on line 3—3 of FIG. 2 showing details of mechanism for opening and closing sheet-molding components of the shaping unit.
FIG. 4 is an enlarged view taken on line 4—4 of FIG. 2 showing the cross-section of a guide trough for delivering shaped covers or the like from the molding mechanism to a stacker.
FIG. 5 is an enlarged cross-section view taken on line 5—5 of FIG. 2 showing details of the stacker.

Referring to the drawings and more particularly to FIGS. 1 and 2, the embodiment of the invention there illustrated generally comprises a number of identical automatic forming units A mounted on a common base 1 and each of which includes a mechanism F for feeding successive plastic blanks B from a stacked supply in a magazine M to a reshaping and reforming press P where the blank B is reshaped in a series of press operations, illustrated by FIGS. 10–21, inclusive. The resulting plastic container cover C (FIG. 21) formed from the blank B is delivered to and automatically stacked in a stacker S (FIG. 2).

More particularly, each forming unit A is adapted to remove one blank B at a time from its magazine M and thereafter accurately align the blank in the molding press P where the cover C is individually formed and thereafter removed and stacked in the stacker S following the forming operation.

Generally, it is preferable to provide a machine having a plurality of the forming units A, all of which may be automatically controlled by a common timer T. Two units A of a six-unit machine are shown in FIG. 1, one in full line and one in phantom, mounted on the common base table frame 1 with the center lines of the several units arranged in oblique parallel for convenience in loading and unloading the several magazines M and stackers S. The illustrated embodiment shows the center lines of the several parallel forming units A arranged at approximately 45 degrees to the front edge 2 of the base table 1 although a different arrangement may be selected as economy of space and convenience of access may require.

Magazine and feed mechanism

Referring more particularly to FIGS. 1 and 2, the magazine M of each unit A includes a generally square frame member 3 that is secured in a horizontal position by downwardly projecting bracket arms 4 which are fastened by bolts 5 to the housing frame 6 of the press P. Secured centrally to each of the four sides of the frame 3 are four vertically disposed guide posts 7 within which the plastic blanks B are vertically aligned and supported in their horizontal positions by inwardly projecting supporting stop fingers 8 which are fastened as by screws 9 to the bottom of each of the posts 7.

In accordance with a preferred form of the invention, the plastic discs or blanks B are removed individually from the bottom of the stack in the magazine M and fed to the forming press P by a suction cup or gripper 10 which is part of the feeding mechanism generally designated F.

More particularly, as shown in FIGS. 1 and 2, the suction cup 10 is located on the outer end of a lever 11, the inner end of which is pivotally secured at 12 to the magazine supporting arms 4 for pivotal movement between the position shown in FIG. 2 and a position in which the rim of a soft rubbery suction member 13 of the cup 10 seats against the under-surface of the lowermost disc B in the magazine.

The pivotal movement of the gripper 10 between the two positions is effected by an hydraulic operated piston motor generally designated 14, the cylinder housing 15 of which is secured by a frame support 16 to the press housing 6 and the piston rod 17 of which, through a connecting rod 18, is pivotally connected at 19 to the lever arm 11. The gripper 10 is moved between the two positions in timed relation to the operation of the molding press P so as to deliver a blank B to the press P prior to each cycle of molding operations of the press.

More particularly, the timer shown in dotted lines in FIG. 1 and generally designated T, includes a continually rotated cam shaft 20 on which are a number of cams 21, each of which actuates the cam follower of an individual valve 22 associated therewith. Any required numbers of such valves 22 may be provided, one of which supplies hydraulic pressure to the rear chamber of the piston motor 14 which advances the piston rod 17 and swings the suction cup 10 into engagement with the bottom blank B in the magazine M. Concurrently, a vacuum is applied to the interior of the cup 10 which thereupon firmly grips and holds the engaged blank B. Thereafter, the fluid pressure to the rear chamber of the cylinder motor 14 is discontinued by the timer T and is valved to the front end of the cylinder 15 so as to retract the piston rod 17 and swing the cup 10 to the position shown in FIG. 2. Thereupon, the suction in the cup 10 is discontinued by the timer and replaced by air pressure which blows the blank B off the cup and down through a guideway 23 into the molding press P.

In drawing the lowermost blank B from the bottom of the stack in the magazine M past the supporting feet 8 on the guide rods 7, the blank is flexed and bent in a manner to separate it from the adjacent blank to which it may tend to cling.

In order to further assure that the blansk are transferred one at a time from the magazine M to the press P and to separate from the blank being transferred any blanks which tend to stick and adhere thereto, additional means for separating the blanks preferably are provided.

More particularly, as shown in FIGS. 1 and 2, a pair of horizontally disposed blades 25 are secured below the feet 8 on opposite sides of the path traveled by the blank while being transferred on the suction cup 10 from the magaziue M to the press P. Preferably the blades 25 are more closely spaced than the diametrically disposed feet 8 and effect greater flexure of the blanks B drawn therebetween than is effected by the feet. Separation of blanks which tend to adhere together is further assured by curved members 26 and 27 which have coarse file-like serrations 28 against and over which the edges of the blanks are drawn by the cup 10. In the illustrated embodiment, the upper serrations 28 of the member 26 are located directly beneath the foot 8 which is most remote from the axis 12 of the transfer arm 11 and the member 26 extends in an arc about the axis 12 as a center to a point just short of the position to which the blanks B are delivered by the cup 10. The arrangement is such that the serrations 28 of the member 26 engage the edge of the blank B immediately after the blank is drawn past the supporting feet 8 and continue to engage and act to riffle and thereby separate the gripped blank B from any tendency to adhere thereto. As the gripped blank is drawn between the blades 25, the blades 25 independently and in combination with each other and with the member 26 coact to further effect separation of any adhering blanks and thereafter the members 27 individually and in combination with each other and with the member 26 act to further assure separation of any adhering blanks.

The members 27 are disposed on opposite sides of the path of travel of the gripped blank with their serrations in rubbing engagement with opposite edge portions of the blank concurrently with the edge-engagement of the blank with the serrations of the member 26. The members 26 and 27 retain any blank that is thus disengaged and separated from the blank B which is gripped by the cup 10, and the cup engages and grips the blank so retained on the following swing of the cup 10 to the magazine M.

In order to regulate the weight of the stack on the bottom blank B in the magazine M, means may be provided for continually relieving each bottom blank B of the weight of all but a few of the blanks in the stack and for assuring that the weight on the bottom blank is always substantially the same when the blank is withdrawn from the magazine despite changes in the height of the stack occasioned by feeding and refilling operations.

Figure 2A:
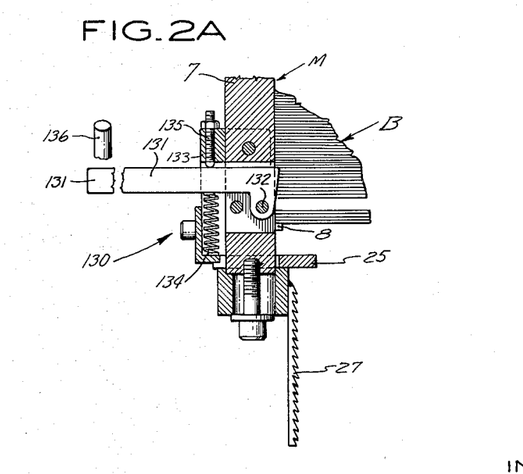
FIG. 2A is a cross-section view taken on line 2A—2A of FIG. 2 and showing details of mechanism regulating blanks in a feeder magazine.

More particularly, as shown in FIGS. 1, 2, and 2A, this mechanism is generally designated 130 and includes a lever 131 which is pivotally mounted by pin 132 in a bracket 133 which is secured on one of the magazine guide posts 7. A compression spring 134 located between the lever 131 and the bracket 133, as shown in FIG. 2A, yieldably urges the lever 131 upwardly against an adjustable stop 135 so as to pivot the lever clockwise and press the shoulder 131a of the lever 131 into clamping engagement with the stack of blanks B.

Secured on the shaft 12 is a lever arm 136 which engages and depresses the lever 131 when the motor 14 swings the arm 11 and suction cup 10 clockwise to the position shown in FIG. 2. With the lever 131 depressed, the binding engagement of the lever portion 131a on the stack of blanks B is relieved and the blanks settle down in the magazine. Thereafter, the lever 136 disengages the lever 131 which automatically swings upwardly responsive to the spring 134 and yieldably binds the stack of blanks B as shown in FIG. 2A. The suction cup 10 in the last portion of its upward movement, engages and raises the stack of blanks so that as the cup 10 moves downward, the weight of only the portion of the stack below the clamps 131a rests on the bottom blank B as the blank is drawn past the supporting feet 8 by the cup 10. The clamp 131a supports the weight of the upper portion of the stack. Consequently, despite continual change in the height of the stack, the weight on each bottom blank as it is removed always is small and substantially the same.

Figure 11:
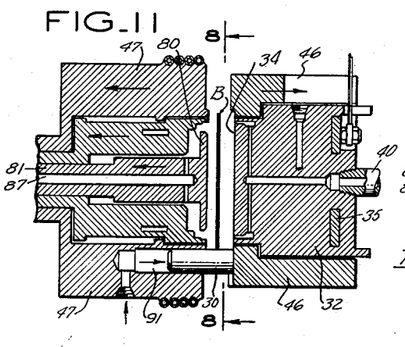

After a blank B is swung by the cup 10 through 90° from the magazine M to the position shown in FIG. 2, vacuum to the gripping cup 10 is relieved and preferably replaced by the timer T with superatmospheric pressure which blows the blank B from the cup 10. Guides 29 are provided to hold the blank B in engagement with the members 26 and 27 during the retraction stroke of the cup 10. Thereafter, the blank drops into the guideway 23 and is guided into the press P where, as shown in FIGS. 8 and 11, the blank is stopped and supported by pins 30.

*Press*

Figure 6:
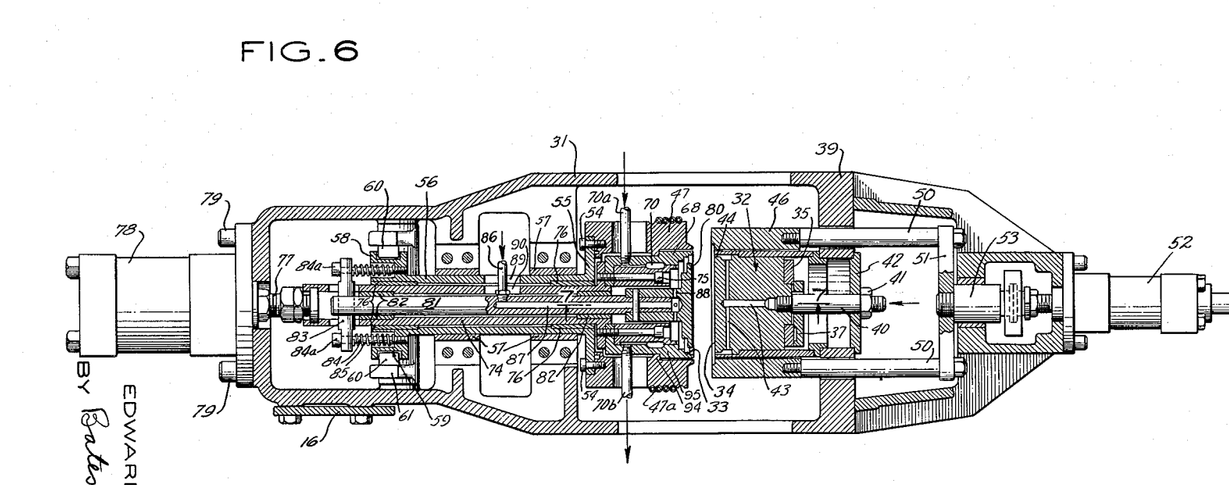
FIG. 6 is an enlarged cross-sectional view taken generally on line 6—6 of FIG. 2.
Figure 7:
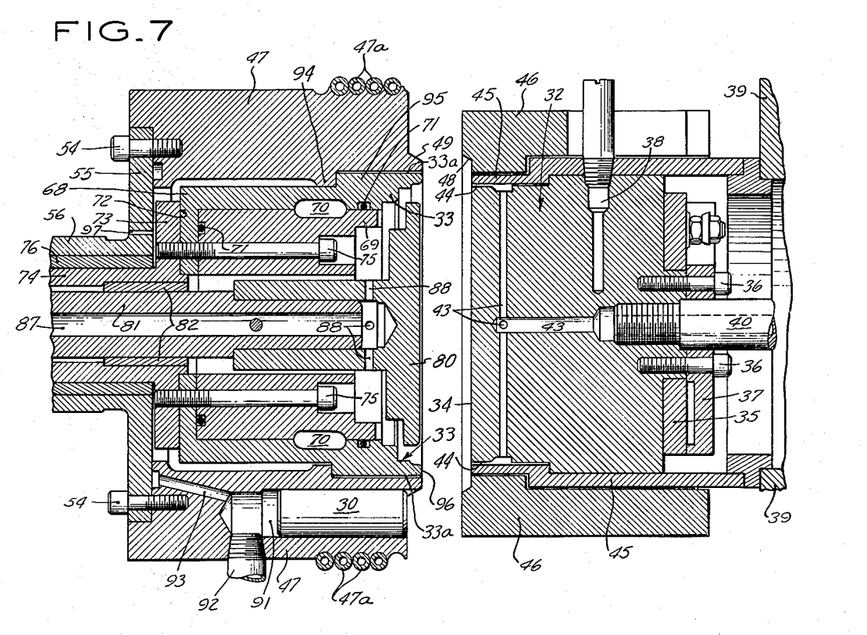
FIG. 7 is an enlarged cross-sectional view taken generally on the line 7—7 of FIG. 6 showing the mold components for shaping the plastic sheet material.
Figure 21:
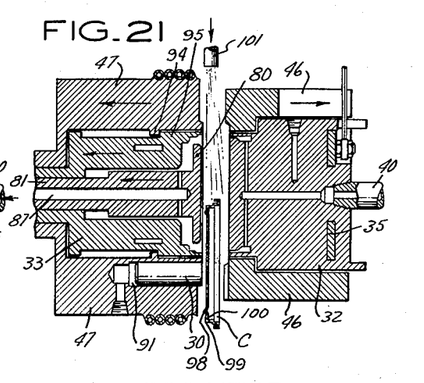

The press P includes a frame generally designated 31 which is secured to the table 2 and on which is secured apparatus for remolding a blank B into a cover C (FIGS. 9 and 21). As shown in FIG. 6, there is located in the center of the frame 31 a stationary press platten generally designated 32 and a movable press platten generally designated 33. The platten 32 has a flat circular forward face 34 and is heated by an electrical heating element 35, or other suitable heating means, which as shown in FIG. 7 may be secured in good heat-transferring engagement to the rear face of the platten 32, as by bolts 36 and cap plate 37. A thermocouple well 38 is provided in the platten 32 in which may be located the thermocouple of suitable temperature controls for maintaining the platten 32 within a desired temperature range so that a blank B when pressed against the platten face 34 is heated to a proper molding temperature by the platten.

As shown in FIG. 6, the platten 32 is secured to crossmember 39 of the frame 31 by a tubular member or pipe 40, together with a nut 41 and a cross-plate 42. The tube or pipe 40 is connectable through the timer T with a source of blowing air (not shown) for stripping heated blanks B from the platten heating face 34. For this purpose, the tube 40 communicates through internal passages 43 with a fine annular orifice 44 which preferably is located adjacent the periphery of the circular heating face 34. As shown in FIG. 7, the annular orifice 44 may be provided between the cylindrical periphery of the platten 34 and a fixed cylindrical sleeve 45.

Slidably supported on sleeve 45 is a cylindrical clamping ring member 46 which cooperates with a similar clamping ring 47 slidably mounted on the platten 33 to secure a blank B therebetween. Preferably, the front or clamping face of the ring 46 has a tapered annular recess 48 which snugly receives a corresponding tapered annular shoulder 49 and guides and presses the blank B into accurately centered position in the shaping press.

As shown in FIG. 6, tie rods 50 slidably extend through the frame member 39 and secure the clamping sleeve 46 to a crosshead 51 so that the sleeve 46 may be advanced and retracted by a cylinder motor 52, the piston rod 53 of which is secured to the crosshead 51. The motor 52 is secured to the frame 31 and is supplied operating fluid by the timer T to advance and retract the clamping sleeve 46. Preferably the fluid to advance the sleeve 46 is fed through a small orifice (not shown) or otherwise suitably throttled so as to provide a slow advancing stroke. Normally, rapid retraction of the sleeve 46 is preferred, in which case the operating fluid from the timer T for retracting the sleeve 46 is not throttled to the motor 52 and effects speedy retraction.

The cooperating clamping sleeve 47 which is slidably supported on the movable mold member 33 is secured by bolts 54 to the front face 55 of a flanged sleeve 56 which is slidably journaled in bearings 57 secured to the frame. Rear flanged portion 58 of the sleeve 56 is recessed as at 59 to receive lugs 60 of a yoked lever member 61 which is pivotally mounted at 62 (FIG. 2) to the frame 31 and operatively connected at 63 to piston rod 64 of a cylinder motor 65, the housing of which is pivotally secured at 66 to a bracket 67 that is fastened to the table 2. Operating fluid pressure material is supplied by the timer T to the motor 65 so as to advance and retract the piston rod 64 which operates through the yoked lever 61 to advance and retract the clamping sleeve 47 in timed relation to the operation of the other components of the press P.

Referring more particularly to FIGS. 6 and 7, the movable platten 33 preferably is formed in two principal parts 68 and 69 between which is provided an internal passageway 70 within which to maintain a circulation of a liquid temperature control medium, such as oil or water, through intake and outlet 70a and 70b, respectively. Gaskets 71 may be provided to prevent leakage of the liquid temperature regulating medium from between the parts 68 and 69 which are secured together and to the front face 72 of the flanged end 73 of a sleeve 74 by bolts 75.

As shown in FIG. 6, the sleeve 74 is slidably journaled in cylindrical bearings 76 within the outer sleeve 56 and is secured at its rear end to piston rod 77 of cylinder motor 78, the housing of which is secured by bolts 79 to the frame 31. Oil or other operating medium is supplied under pressure by the timer T to operate the motor 78 and thereby advance and retract the mold member 33.

Figure 17:
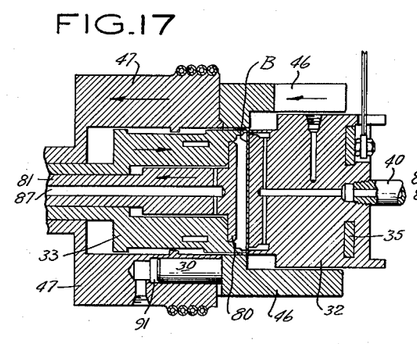
Figure 19:
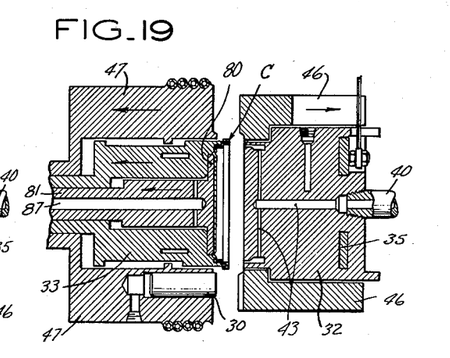
Figure 20:
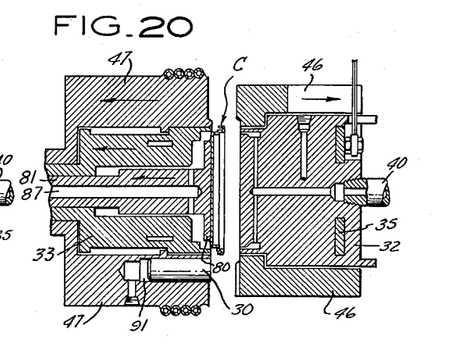

Recessed within the mold 33 is an inner mold member 80 which is movable with the clamping ring 47. More particularly, the member 80 functions as a knockout or stripper plate for removing a molded article from within the molding cavity, as shown in FIG. 20. During the molding operation, the member 80 moves with the clamping ring 47 and seats snugly against the mold member 33 when the ring 47 is retracted, as shown in FIGS. 17–19, and is adopted to strip the molded plastic article from the mold cavity when the mold 33 is retracted relative to the ring 47 and stripper plate 80 as shown in FIG. 20.

The member 80 as shown in the drawings is a generally circular plate, a centrally disposed hub portion of which is pinned on the end of a shaft 81 which is slidably journaled in bushings 82 within the hollow sleeve 74. The rear end of the shaft 81 is secured to a crosshead 83 through which slidably extend bolts 84 secured to the sleeve flange 58. Compression springs 85 are held under compression about the bolts 84 between the crosshead 83 and the flange 58 and yieldably hold the crosshead 83 against the heads 84a of the bolts 84.

As shown in FIG. 6, an air pipe 86 is secured to the shaft 81 and communicates through passages 87 and 88 with the space between the cavity in the mold 33 and the stripper plate 80. The pipe 86 extends radially from the shaft 81 through aligned elongate slots 89 and 90 in the sleeves 74 and 56 so as to permit axial movement between the shaft 81 and the sleeve members through which the pipe 86 extends.

Figure 18:
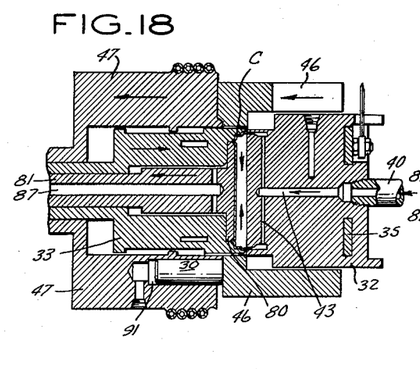

Preferably, the pipe 86 is connected to the timer T which provides for a blast of air to assist the stripper 80 in stripping a molded article from the cavity of the mold member 33 and to provide escape for air between the blank B and the mold 33 when the blank is forced into the cavity of the mold 33, as shown in FIG. 18.

Figure 12:
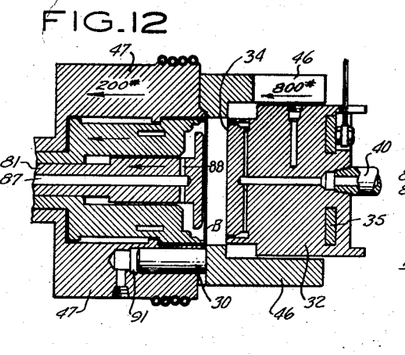

Referring to FIG. 7, each of the pins 30 is slidably journaled in the clamping ring 47 in individual bores 91 into the rear of which air under pressure is introduced by the timer T through a pipe 92 and connecting passages 93 to force the pins 30 outward against the clamping ring 46 to receive and support a blank B as shown in FIGS. 8 and 11. Subsequent movement of the ring 46 forces the pins 30 back in the bores 91, as shown in FIG. 12, where the pins 30 remain as shown in FIGS. 13–21 until again advanced by air from the timer to the position shown in FIG. 10 preparatory to receiving the next blank B.

The temperatures of components of the shaping apparatus preferably are automatically controlled and maintained relative to the unmolding temperature of the plastic which is to be shaped. In the case of oriented polystyrene, which has an unmolding temperature of the order 210° F., a temperature range of approximately 50°–200° has been found satisfactory for the mold 33 and the knockout plate 80, the temperatures of which are controlled by the fluid circulated in the passageways 70. While this temperature may be varied, it is desirable that the temperature be maintained substantially uniform through the molding surfaces of the members which are contacted by and shape the blank B.

The cylindrical clamping ring 47 preferably is maintained by the heating coils 47a at a temperature somewhat above the unmolding temperature and may be maintained in the temperature range of 250–270° F.

The cylindrical clamping ring 46 preferably is held at a temperature slightly below the unmolding temperature as for example, 200° F. and the member 32 is heated by the heater 35 so as to maintain the forming surface 34 above the unmolding temperature as, for example, in a 260–280° F. range.

Figure 10:
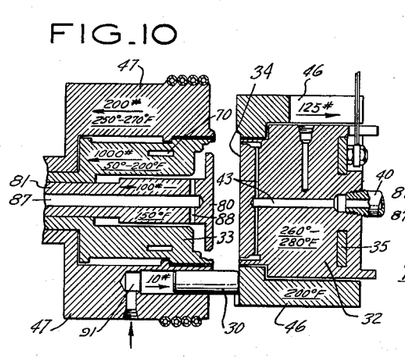
FIGS. 10–21, inclusive, are cross-section views on a reduced scale of the mold components shown in FIG. 7 showing successive positions of the mold components in shaping a container lid from a plastic blank.

Suitable temperatures for reshaping and reforming oriented polystyrene are marked on each of the several components 32, 33, 46, 47 and 80 shown in FIG. 10. These temperatures may be maintained throughout the entire cycle of operations illustrated by FIGS. 10–21.

The directions of the forces applied to the components by the several motors 52, 65 and 78 are indicated by arrows in FIGS. 10–21 and illustrative amounts of the forces noted. The opening or retracting forces exerted on the components are not as great as the forces which advance and hold the several components in closed positions. While the amounts of the forces are not critical, it is important that a similar relation of the forces exerted by the several components of the apparatus be maintained. Thus the advancing force exerted by the mold member 33 responsive to the motor 78 preferably is greater than the force exerted in the mold cavity by air introduced through the passages 40, 43, and 44, and the clamping force of the rim-gripping ring 47 preferably is greater than the clamping force exerted in the opposite direction by the cooperating cylindrical ring 46 responsive to the hydraulic motor 52 (FIG. 2).

The operation of the forming apparatus is hereinafter described with particular reference to FIGS. 10–21 which show successive positions of the apparatus in effecting the reshaping of disc or blank B into the shaped cover or lid shown in FIG. 21.

As shown in FIG. 10, the mold 33 is in the retracted or open position under a substantial load from the motor 78 (FIG. 2) which for illustrative purposes is indicated at 1000 pounds. The clamping ring 47 is in the fully retracted or open position under a load from the motor 65 (FIG. 2), which is substantially less than the load on the member 33 and indicated as 200 pounds. The knockout member 80 is fully retracted by the crosshead 83 and the springs 85 (FIG. 6) which may be under a light load of the order of 100 pounds, to the end of the stroke permitted by the heads 84a of the bolts 84 which are secured to the ring member 47.

The clamping ring 46 is in the retracted or open position under a light load from the motor 52 (FIG. 2) which may be of the order of 125 pounds.

Air pressure of the order of 50 pounds has been applied momentarily by the timer T to advance the pins 30 into engagement with the ring 46 preparatory to receiving a disc or blank B from the vacuum cup 10.

FIG. 11 differs from FIG. 10 in that a disc B has been dropped into position on the pins 30. The two side pins 30 (FIG. 8) each allow for a slight clearance from the edge of the disc B. However, the top of the lower or bottom pin 30 exactly coincides with and supports the bottom of the blank properly centered relative to the clamping and mold members 46, 47 and 32, 33.

Thereupon the timer T through one of the valves 22 reverses the direction of the force of the motor 52 (FIG. 2) which forces the clamping ring 46 to the left as shown in FIG. 12 so that the ring 46 grips and holds the lip or rim of the blank B against the heated ring 47 under a load which may be of the order of 800 pounds while the rim is heated for forming. Concurrently the pins 30 are pushed back into the ring 47 as shown by the ring 46.

Figure 13:
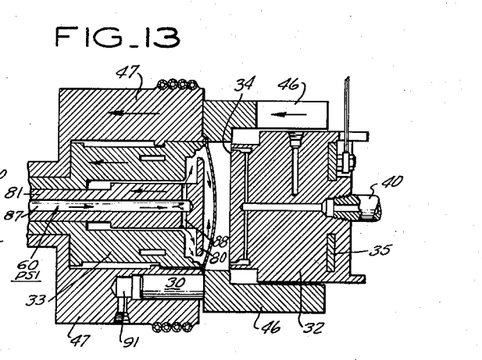

Thereafter the timer T supplies air pressure which is introduced through passages 87 and 88 to dome the disc 11 as shown in FIG. 13.

Figure 14:
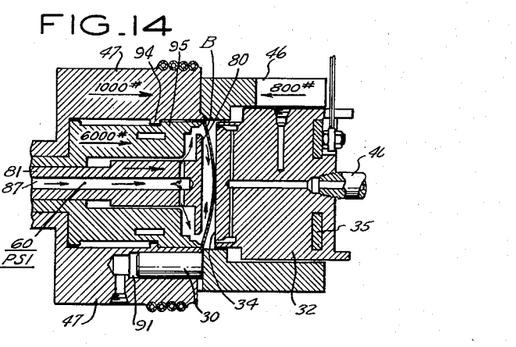

Thereupon, as shown in FIG. 14, the direction of force exerted by the motors 65 and 78 (FIG. 2) is reversed, as indicated by the direction arrows. Greater hydraulic force is exerted by the motor 78 than by the motor 65 so that the mold 33 is advanced under a load greater than that on the ring 47. Illustrative of suitable forces are the 6000 and 1000 pound loads indicated on FIG. 14.

The advance of the ring 47 causes the bolts 84 (FIG. 6) to advance the crosshead 83 and the knockout member 80 under the 1000 pound load. The flow of hydraulic pressure medium to the motor 78, which operates the mold 33, is restricted or throttled and the flow to the motor 65, which operates the clamping ring 47, is substantially unrestricted. Consequently, an annular shoulder 94 on the ring 47 maintains engagement with a shoulder 95 on the mold member 33 and prevents leakage and loss of air pressure which domes or bulges the blank B as the disc moves toward the heater surface 34.

While doming air pressure is shown initiated before advancing the blank B toward the heating surface 34, the initial application of the air pressure may be applied concurrently with initial movement of the blank toward the heater, or at any time during the movement, as long as the crown of the dome, which is at the center of the blank, first engages the surface 34 and further contact with the disc is made progressively outward from the center. Thus air is forced radially outward from between the blank B and the heating surface 34 and is not captured in isolated areas therebetween.

As an alternative to "doming," the blank B may be advanced flat without doming toward a modified heater (not shown) having a convexly curved surface, the crown of which is initially contacted by the center of the flat disc.

It will be apparent that the closing pressure may be applied on the ring 47 prior to or concurrent with the closing pressure on the mold 33. However, no closing movement of the ring 47 or the mold 33 is effected until the closing pressure replaces or overcomes the counterpressure exerted by the motor 78 on the mold 33. This counter or mold opening pressure of the motor 78, together with the closing pressure exerted on the ring 46 by the motor 52 prevent closing movement of the ring 47 until the opening pressure of the motor 78 on the mold 33 is replaced or overcome by the substantially greater closing pressure. If the closing (6000#) pressure, even though throttled, were exerted on the mold 33 appreciably earlier than the closing (1000#) pressure is exerted on the ring 47, the mold 33 would tear the center of the blank B from the edge portion gripped between the gripping rings 46 and 47.

Figure 15:
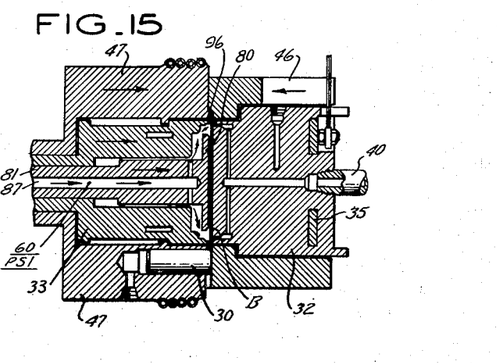

As shown in FIG. 15, the advancement of the blank B is stopped when the rim 96 of the mold 33 presses the blank firmly against the stationary heating plate 34, as shown, whereupon advance of the ring 47 is stopped through the engagement of the shoulders 94 and 95 when the advancement of the mold 33 is stopped by the hot plate 34. In this alternative arrangement, the gripping surfaces of the rings 46, 47 preferably lie in substantially the same plane as the rim 96 of the mold 33 when the shoulders 94 and 95 are engaged. Although generally unnecessary, the mold 33 may be provided with an adjustable stop (not shown) for limiting its forward stroke to a preselected clearance from the plate 34 so that the blank B is not excessively squeezed therebetween.

Figure 16:
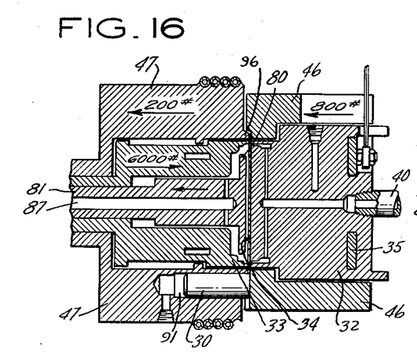

Following suitable heating of the blank B through engagement with the heating surface 34, the direction of the force exerted on the ring 47 by the motor 65 is reversed by its timer valve 22 so as to retract the ring 47. The retracting force of the motor 65 on the ring may be of the order of 200 pounds. Inasmuch as the hydraulic pressure medium is supplied substantially unthrottled and no substantial resistance is encountered, the retraction of the ring 47 relieves the ring 46 of restraint and the latter advances in the direction of the retracting ring 47 responsive to the greater force exerted by the motor 52. However, hydraulic pressure medium to the motor 52 is throttled so that the rate of advance of the ring 46 is slower than that of retraction of the ring 47. Consequently the ring 47 draws away from the ring 46 and, as shown in FIG. 16, releases the rim of the blank B which has been pinched therebetween. Retraction of the ring 47 effects corresponding retraction of the knockout member 80 through the spring 85 and the crosshead 83 (FIG. 6) to the limit permitted by engagement with the mold 33.

FIG. 17 differs from FIG. 16 in that the ring 47 has been retracted to the limit of its back stroke and the ring 46 has advanced to the end of its forward stroke. The rim of the blank B, which has been heated by contact with the heated ring 47, is pressed by the ring 46 into cooling and setting contact with the outer sidewall 33a of the mold 33 and thereby forms the rim of the blank into the desired shape for the finshed cover.

Retraction of the knockout 80 is interrupted by engagement with the mold 33 and further retraction of the ring 47 to the end of its back stroke acts to compress the springs 85 (FIG. 6) between the flange 58 and the crosshead 83. The forward surface of the member 80 completes the cavity forming wall in the mold 33 against which the center portion of the blank is to be shaped. Passages (not shown) along the parting line of the engaged members 33 and 80 provide continued communication for the air pressure from the line 86 into the mold cavity.

Thereupon the line 86 is opened to atmosphere by the timer thereby relieving the blank from the air pressure which had held the disc in overall surface engagement with the heating plate 34. Substantially simultaneously, as shown in FIG. 18, air pressure in an amount sufficient to blow mold the heated blank is applied through lines 43 and 44 in the heating member 32 to blow-mold the heated central portion of the blank into shaping and setting engagement with the relatively cold mold cavity walls provided by the members 33 and 80. Air in the cavity is exhausted to atmosphere through the passages 87 and 88 and the line 86.

In the illustrated embodiment, a strengthening annular ring 98 (FIGS. 9 and 21) is molded in the cover at the parting line of the members 33 and 80, and a beaded shoulder 99 is formed which is adapted to press firmly against the inner wall of a generally cylindrical container (not shown) with which the cover is intended to be used. The cavity of the mold 33 also formed the sidewall of the cover with a nesting shoulder 100 which is adapted to receive the beaded shoulder 99 of an adjacent cover and "nest" the covers properly when stacked.

FIG. 19 differs from FIG. 18 in that air pressure in line 43 from the timer T has been shut off and the members 33 and 46 retracted by reversing the direction of pressure on their respective motors 78 and 52 (FIG. 6).

Preferably the members 33 and 46 are retracted and the air pressure on the cover from line 43 is relieved at a time, which may be selected by trial and error, and at which final setting of the cover is accompanied by a slight shrinkage and unmolding of the beaded shoulder 99 to a preselected slightly smaller size than the annular mold cavity in which it is formed so that the cover, including the bead 99, is readily strippable from the cavity.

Air pressure captured in the line 43 by the timer aids in separating the molded cover C from the hot plate surface 34 when the mold 33 and ring 47 are retracted.

Thereafter the mold 33 is retracted to the limit of its back stroke while the springs 85 (FIG. 6) force the crosshead 83 back to the limit permitted by the heads 84a of the bolts 84. Subsequent further retraction of the mold 33 relative to the knockout member 80 causes the latter to strip the cover from the forming cavity as shown in FIG. 20.

Preferably, air pressure is reestablished in the passageway 87 to separate the cover C from the mold cavity before the knockout member 80 is actuated and a further stream of air from an upper nozzle 101 blows the cover out of the molding apparatus and down through a chute 102 to the stacker as shown in FIGS. 2 and 21. Thereafter, the air pressure in the line 87 and to the nozzle 101 is shut off by the timer and the molding apparatus is ready for a repetition of the cycle beginning with the advancement of the pin 30, as shown in FIG. 10.

*Stacker*

The finished cover drops through the chute 102 (FIGS. 2 and 4) into an upwardly inclined channel 103 in the stacker S and is pushed by a plunger 104 through a pair of resilient fingers 105 (FIG. 5) which spring back to retain the cover in the advanced position in the channel 103 at the bottom of the stack of covers when the plunger 104 is retracted by the motor 106 preparatory to receiving and stacking the next cover at the bottom of the stack.

Preferably, as shown in FIG. 4, the walls of the chute 102 are cut away as much as possible to reduce to a minimum the static attraction and tendency of the covers C to stick to the chute walls and to assure that the covers drop on to the bottom member 107 of the channel 103.

The spring fingers 105, as shown in FIG. 5, may be mounted on side plates 108 which are bolted to the inner sides of the side rails 109 of the channel 103. Considerable clearance is provided between the rails 109 for the stack of covers which are accurately stacked by the more confining clearance afforded between the plates 108.

The side plates 108 preferably are slotted to receive the spring fingers 105 when a cover C is forced by the plunger 104 between and cams the fingers out.

*Controls*

Timing of the machine is accomplished by a cam shaft driven by an electric motor. Individually adjustable cams operate the hydraulic valves 22 which control operation of the motors 15, 52, 65, 78 and 106, and the timer also controls vacuum in the cup 10 and air pressure in air lines 40, 87, 92 and 101. The timing apparatus is conventional and shown only schematically in the drawings.

*Second embodiment*

FIGS. 22–25 show a modified mold construction in which the unmodified components are identified by the same reference numbers as the same components have in the mold construction shown in FIG. 7 and modified components are identified by primed numbers which correspond to the unprimed numbers of the corresponding unmodified components.

Figures 23, 24, 25, 26:
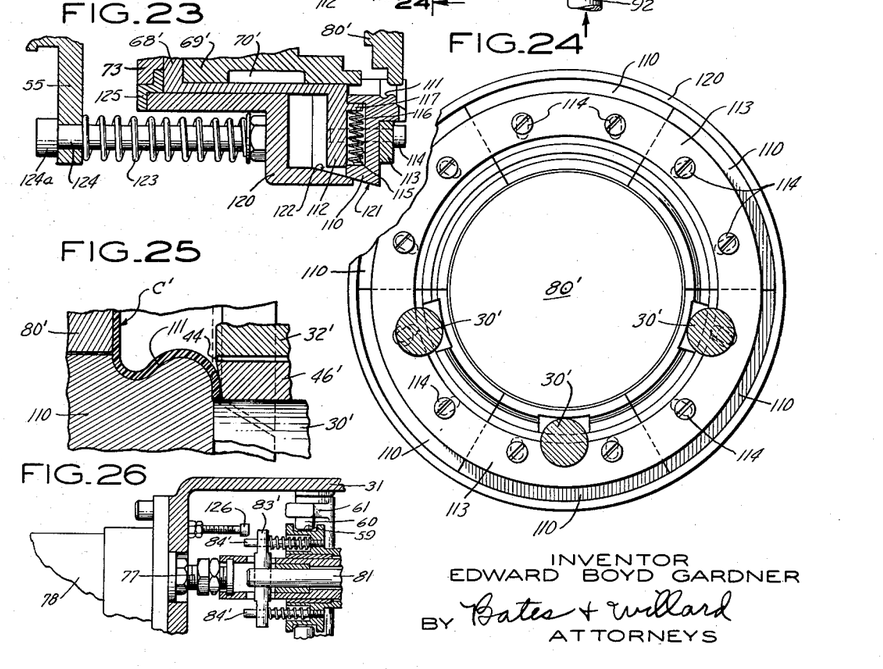
FIG. 23 is a view of a portion of the molding mechanism of FIG. 22 in an open-mold position of operation for facilitating removal of the cover from the mold.
FIG. 24 is a cross-section view taken on line 24—24 of FIG. 22.
FIG 25 is an enlarged fragmentary view in cross-section of a portion of the molds of FIG. 22 in closed position for molding and showing an edge portion of the cover which is molded therein.
FIG. 26 is a view of a modified portion of FIG. 6 adapted to the operation of the embodiment shown in FIGS. 22–24.

The modified construction is adapted to the molding of covers and other articles which have substantially undercut portions, such as shown in FIG. 25, that cannot be stripped from a one-piece mold without danger of rupture and breakage.

The mold unit which is generally designated 33' is provided with radially movable components 110 which can be retracted to release the undercut portion 111 of the modified cover C' from the mold. Thus a multi-sector peripheral mold portion is provided to cooperate in the formation of an undercut portion such as 111.

More particularly, the mold member 33' includes inner and outer sleeve-like sections 68' and 69' between which is the chamber 70' in which temperature-maintaining fluid is circulated from the pipe connection 70a from the timer T, as in the embodiment of FIG. 7.

Figure 22:
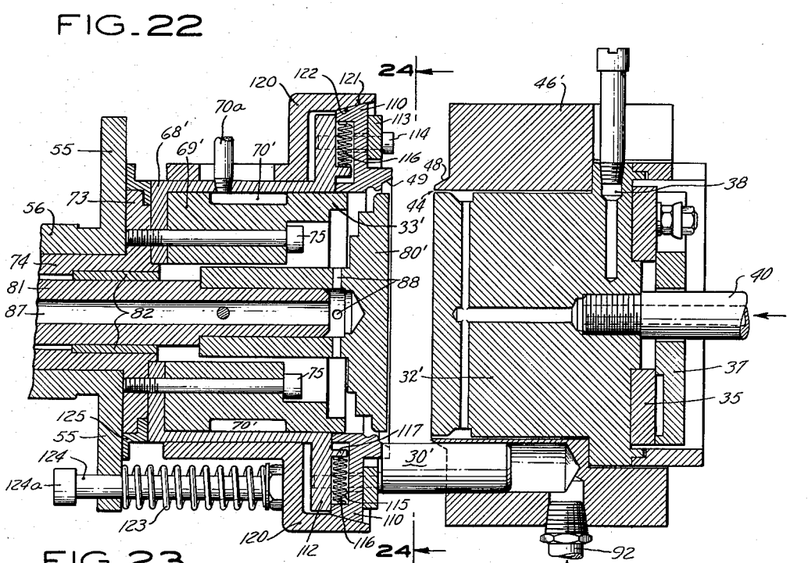
FIG. 22 is an enlarged cross-section view similar to FIG. 7 of a modified mold construction for forming a container cover of different shape from a plastic blank.

As shown in FIGS. 22 and 23, the mold 33' is secured by the bolts 75 to the forward flange 73 of the sleeve 74 for advancement and retraction by the motor 78 (FIG. 1) responsive to the timer T.

As shown in FIGS. 22 and 23, the forward end of the mold member 68' is provided with an annular flange 112 on the front surface of which the individual segments 110 (FIG. 24) are slidably secured by means of a retaining ring 113 and bolts 114. Each of the segments 110 includes a chamber 115 containing a compression spring 116 which is compressed between the segment 110 and a stop 117 projecting from the flange 112 into the chamber 115. The springs 116 yieldably hold the individual mold segments 110 in the radially outermost positions permitted by engagement of segment walls 118 with the stops 117.

The segments 110 are forced inwardly to their molding positions shown in FIGS. 22 and 25 by a camming ring member 120 which is slidably supported on the sleeve member 68'. The ring member 120 includes an internal annular camming surface 121 which is tapered to conform to the tapered outer peripheral surface 122 of each segment 110 and cams the segments 110 inwardly to the molding positions shown in FIGS. 22 and 25 against the yieldable force of the springs 116 when the ring is advanced by the motor 65 (FIG. 1) acting through the sleeve 56 and springs 123.

More particularly, as shown in FIGS. 22 and 23, the compression springs 123 are disposed on individual bolts 124 which are secured in the ring 120 and extend rearwardly therefrom through the flange 55 of the sleeve 56. Each spring is preloaded between the ring 120 and the flange 55. Secured to the mold 33' is a stop 125 that is engaged by and thereby limits the retraction of the ring 120. Retraction of the ring 120 is effected by the flange 55 which, when drawn rearwardly by the motor 65, engages the heads 124a of the bolts 124 and draws the ring 120 to the position shown in FIG. 23 in which the segments 110 are relieved of the restraint and are forced outwardly by the springs 116 to the open-mold position.

As shown in FIG. 26, headless bolts 84' are substituted for the headed bolts 84 of FIG. 6 and a stationary stop member 126 rather than bolt heads 84a is engaged by and limits rearward travel of the crosshead 83' and the mold knock-out plate 80' (FIG. 22). Consequently, movement of the knock-out member 80' to the forward or molding position is effected in the embodiment of FIGS. 22-26 by the mold 33' independently of the motor 65 and the clamping ring 120 and the rearward or knockout position is determined by the stationary stop 126 (FIG. 26) rather than by the bolt heads 84a shown in FIG. 6 of the first embodiment.

In the embodiment shown in FIGS. 22-26, supporting pins 30' are located in clamping rings 46' and the stationary heating member 32' is illustrated as a one-piece member rather than having the two pieces 43, 45 of the corresponding member 32 of the embodiment shown in FIG. 7.

In operating the embodiment of FIGS. 22-26, a plastic disc or blank B is dropped onto the locating pins 30 and the mold 33' advanced by the motor 78 (FIG. 6) so that the mold segments 110, which preferably have been previously closed as shown in FIG. 22 by the camming ring 120 responsive to the timer T and motor 65 (FIG. 2), center and grip the rim of the blank B against the advanced clamping ring 46'.

Thereafter air pressure from the timer T through the passageways 87, 88 preferably dome the blank B substantially as shown in FIG. 14 while the blank gripped between the mold ring segments 110 and the clamping ring 46' is moved to the heater 32' and to a heating position corresponding to that shown in FIG. 15 where the blank is held by air pressure supplied from the timer T through the mold passages 87, 88.

The heated blank B next is blown into the cavity formed in the mold 33' by the knockout plate 80' and the closed mold ring segments 110 to mold the cover C', as shown in FIG. 25.

Thereafter, the camming ring 120 is retracted by the motor 65 so that the mold segment 110 opens and the mold 33' is retracted by the motor 78 while the ring 46' is retracted by the motor 52 responsive to the timer.

Rearward movement of the knockout member 80' is interrupted by the stop 126 (FIG. 26) which strips the cover C' from the mold without interference of the under cut 111 with the open mold segments 110 preferably aided by air pressure supplied through mold passages 87, 88.

Thereafter the pins 30' are advanced by air pressure supplied through line 92 and the molding apparatus of FIGS. 22-26 is ready to repeat the cover molding cycle.

Obviously those skilled in the art may make various changes in the details and arrangement of parts without departing from the spirit and scope of the invention as defined by the appended claims, and I therefore do not wish to be restricted to the precise construction of the illustrative embodiments disclosed.

Having thus disclosed embodiments of my invention, I claim:

1. The method of shaping articles from thermoplastic sheet material which comprises pneumatically doming the sheet material while gripping the periphery thereof to form the sheet material into a freely domed shape in a cool and set condition, moving the gripped perimeter and the domed sheet material and the surface of a heating member relative to each other to progressively engage the sheet material commencing at the center of the domed shape with the surface of the heating member, heating and softening said material while in engagement with said surface, thereafter blow molding the softened portions of the material, and cooling and setting the blow molded portions.

2. The method recited in claim 1 and wherein said doming is effected in a first direction and the blow molding is effected in the opposite direction and wherein the heating is effected while the sheet is flattened relative to said doming.

3. The method of shaping articles from thermoplastic sheet material which comprises gripping the perimeter of an area of the sheet material to be shaped, creating a pressure differential between the opposite sides of the sheet material to form the area into a freely domed shape, moving the gripped perimeter and the domed shape area of sheet material while gripped at its perimeter and the heated surface of a heating member relative to each other to carry the domed shape area into engagement to heat and soften substantially all of the area of the sheet material, thereafter blow molding the softened area of the sheet material, and cooling the blow molded portion of the sheet material to set the same.

4. The method of shaping articles from thermoplastic sheet material which comprises gripping the perimeter of an area of the sheet material to be shaped, creating a pressure differential between the opposite sides of the sheet material to form the area into a freely domed shape, moving the gripped perimeter to carry the domed shape area of sheet material commencing at the center of such area into progressive engagement with the heated surface of a heating member to heat and soften substantially all of the area of the sheet material, thereafter creating a pressure differential between opposite sides of the sheet material to move the heated softened area of the sheet material away from the heated surface and into conformity with a mold to blow mold the sheet material, and cooling the blow molded portion of the sheet material to set the same.

5. In molding apparatus for shaping articles from thermoplastic sheet material, a first press platten member having a mold portion thereon, a second press platten member having means for heating a surface thereof to soften thermoplastic material engaged therewith, said second press platten member being disposed opposite said mold portion of said first platten member, a first clamping ring member mounted on said first platten member for movement independent of said first platten member, a second clamping ring member operably mounted on said second platten member for movement independent of said second plattern member and said first clamping ring member, actuating means for said ring members to move said ring members independent of said platten member into gripping engagement with the perimeter of sheet material to be molded to retain the material intermediate said press platten members, passage forming means in one of said first members for introduction of fluid pressure to form the sheet material in domed shaped extending toward the heated surface of said second platten member, said actuating means being further operable to move said ring members independent of said platten members and while gripping the sheet material to carry the domed shape sheet material into progressive engagement with the heated surface of said second platten member to soften the material, and passage forming means in one of said second members for introduction of fluid pressure to blow mold the softened sheet material into conformity with said mold portion on said first platten member.

6. In molding apparatus for shaping articles from thermoplastic sheet material, a first press platten having a mold portion thereon, a second press platten having means for heating a surface thereof to soften thermoplastic material engaged therewith, said second press platten being disposed opposite said mold portion of said first platten, a first clamping ring mounted on said first platten for movement independent of said first platten, a second clamping ring mounted on said second platten for movement independent of said second platten and said first clamping ring, actuating means for said rings to move said rings independent of said plattens into gripping engagement with the perimeter of sheet material to be molded to retain the material intermediate said press plattens, said first press platten having a passage extending therethrough for introduction of fluid pressure to form the sheet material in domed shape extending toward the heated surface of said second platten, said actuating means being further operable to move said rings independent of said plattens and while gripping the sheet material to carry the domed shape sheet material into progressive engagement with the heated surface of said second platten to soften the material, and said second press platten having a passage extending therethrough for introduction of fluid pressure to blow mold the softened sheet material into conformity with said mold portion on said first platten.

7. In molding apparatus for shaping articles from thermoplastic sheet material, a first press platten having a mold portion thereon, a second press platten having means for heating a surface thereof to soften thermoplastic material engaged therewith, said second press platten being disposed opposite said mold portion of said first platten, operating means connected to said first and second press plattens for moving said plattens relative to each other between open and closed positions relative to each other, a first clamping ring mounted on said first platten for movement independent of said first platten, a second clamping ring mounted on said second platten for movement independent of said second platten and said first clamping ring, actuating means for said rings to move said rings independent of said plattens into gripping engagement with the perimeter of sheet material to be molded to retain the material intermediate said press plattens, said first press platten having a passage extending therethrough for introduction of fluid pressure to form the sheet material in domed shape extending toward the heated surface of said second platten with the plattens in said open position, said actuating means being further operable to move said rings independent of said plattens and while gripping the sheet material to carry the domed shape sheet material into progressive engagement with the heated surface of said second platten to soften the material, and said second press platten having a passage extending therethrough for introduction of fluid pressure to blow mold the softened sheet material into conformity with said mold portion on said first platten with said plattens in said closed position.

8. In molding apparatus for shaping articles from thermoplastic sheet material as recited in claim 7 wherein said operating means and said actuating means include hydraulic motor means, and timer means are provided to control functioning of said motor means and application of fluid pressure through said passages.

9. In molding apparatus for shaping articles from thermoplastic sheet material as recited in claim 7 wherein at least one of said plattens is provided with pressure actuated locating pins extensible between said plattens in open position and disposed to position the sheet material when initially introduced between said plattens.

10. In molding apparatus for shaping articles from thermoplastic sheet material, a first press platten having a mold portion thereon, a second press platten having means for heating a surface thereof to soften thermoplastic material engaged therewith, said second press platten being disposed opposite said mold portion of said first platten, a first clamping ring operably mounted on said first platten, a second clamping ring operably mounted on said second platten, one of said rings having a plurality of mold segments movable outwardly relative to the press platten on which the ring is mounted, means for releasably retaining said mold segments inwardly relative to the press platten with which they are associated to form a supplemental mold portion, actuating means for said rings to move said rings into gripping engagement with the perimeter of sheet material to be molded to retain the material intermediate said press plattens, said first press platten having a passage extending therethrough for introduction of fluid pressure to form the sheet material in domed shape extending toward the heated surface of said second platten, said actuating means being further operable to move said rings while gripping the sheet material to carry the domed shape sheet material into progressive engagement with the heated surface of said second platten to soften the material, and said second press platten having a passage extending therethrough for introduction of fluid pressure to blow mold the softened sheet material into conformity with said mold portion of said first platten and said supplemental mold portion formed by said segments.

11. In molding apparatus for shaping articles from thermoplastic sheet material, a first press platten having a mold portion thereon, a second press platten having means for heating a surface thereof to soften thermoplastic material engaged therewith, said second press platten being disposed opposite said mold portion of said first platten, a first clamping ring mounted on said first platten for movement independently of said first platten, a second clamping ring mounted on said second platten for movement independently of said second platten and said first clamping ring, actuating means for said rings to move said rings independently of said plattens into gripping engagement with the perimeter of sheet material to be molded to retain the material intermediate said press plattens, said first press platten having a passage extending therethrough for introduction of fluid pressure to form the sheet material in domed shape extending toward the heated surface of said second platten, said actuating means being further operable to move said rings independently of said plattens and while gripping the sheet material to carry the domed shape sheet material into progressive engagement with the heated surface of said second platten to soften the material, said second press platten having a passage extending therethrough for introduction of fluid pressure to blow mold the softened sheet material into conformity with said mold portion on said first platten, and one of said clamping rings including a multi-sector peripheral mold portion with each sector being movable angularly relative to the direction of actuating movement of said rings to grip the sheet materials.

References Cited in the file of this patent

UNITED STATES PATENTS

| | | |
|---|---|---|
| 414,840 | House | Nov. 12, 1889 |
| 1,253,316 | Weiland | Jan. 15, 1918 |
| 1,764,215 | Kupper | June 17, 1930 |
| 1,880,858 | Davis | Oct. 4, 1932 |
| 2,120,328 | Ferngren | June 14, 1938 |
| 2,223,321 | Kempe | Nov. 26, 1940 |
| 2,282,423 | Kopitke | May 12, 1942 |
| 2,468,697 | Wiley | Apr. 26, 1949 |
| 2,486,760 | Pfeiffer | Nov. 1, 1949 |
| 2,563,654 | Mackin et al. | Aug. 7, 1951 |
| 2,657,426 | Gora | Nov. 3, 1953 |
| 2,666,951 | Grove et al. | Jan. 26, 1954 |
| 2,674,398 | Courtney | Apr. 6, 1954 |
| 2,680,882 | Hirschmann et al. | June 15, 1954 |
| 2,694,227 | Fordyce et al. | Nov. 16, 1954 |
| 2,702,411 | Winstead | Feb. 22, 1955 |
| 2,765,493 | Winstead | Oct. 9, 1956 |

FOREIGN PATENTS

| | | |
|---|---|---|
| 1,099,479 | France | Mar. 23, 1955 |
| 706,028 | Germany | May 16, 1941 |
| 741,040 | Great Britain | Nov. 23, 1955 |